[19] United States Patent
Ohki et al.

[11] Patent Number: 4,996,904
[45] Date of Patent: Mar. 5, 1991

[54] NEGATIVE PRESSURE BOOSTER EQUIPMENT

[75] Inventors: Junichi Ohki; Atushi Satoh, both of Higashimatsuyama, Japan

[73] Assignee: Jidosha Kiki Co., Ltd., Tokyo, Japan

[21] Appl. No.: 449,261

[22] Filed: Dec. 12, 1989

[30] Foreign Application Priority Data

Dec. 15, 1988 [JP] Japan ................................ 63-317165

[51] Int. Cl.⁵ .............................................. F15B 9/10
[52] U.S. Cl. ................................ 91/369.1; 91/376 R; 92/48; 92/49; 92/98 R
[58] Field of Search ................. 91/369.1, 369.2, 369.3, 91/369.4, 376 R; 92/48, 49, 169.1, 98 D, 98 R

[56] References Cited

U.S. PATENT DOCUMENTS

| | | | |
|---|---|---|---|
| 3,096,689 | 7/1963 | Kytta | 91/376 |
| 3,517,588 | 6/1970 | Kytta | 91/369.2 |
| 4,069,742 | 1/1978 | Gephart et al. | 91/376 R X |
| 4,516,474 | 5/1985 | Ochiai | 92/48 X |
| 4,881,452 | 11/1989 | Newhouse | 92/48 |

Primary Examiner—John T. Kwon
Assistant Examiner—John Ryznic
Attorney, Agent, or Firm—Varndell Legal Group

[57] ABSTRACT

In the negative pressure booster equipment 1 according to the present invention, a groove 27 is provided on the inner peripheral beads 14a and 16a of the diaphragms 14 and 16, fixed on the valve body 8 and forming the power pistons in order to communicate the variable pressure chambers 5b and 7b divided by the diaphragms 14 and 16 with the passages 26 and 28 corresponding to the variable pressure chambers 5b and 7b. Accordingly, the air passages are opened to the variable pressure chambers 5b and 7b through the groove 27 formed on the beads 14a and 16a of the diaphragms 14 and 16. According to this invention, therefore, there is no need to provide wide gap between the fixed portion of the beads and the center plate in order to open the air passages to the variable pressure chambers. This makes it possible to shorten overall length of the negative pressure booster equipment 1.

3 Claims, 2 Drawing Sheets

NEGATIVE PRESSURE BOOSTER EQUIPMENT

BACKGROUND OF THE INVENTION

The present invention relates to a negative pressure booster equipment to be used for brake booster and the like, and more particularly, to a negative pressure booster equipment, in which two or more power pistons are arranged in tandem.

As a brake booster using negative pressure, a tandem type brake booster is conventionally known, in which two power pistons are arranged in tandem, for example, as described in the Japanese Provisional Utility Model Publication No. 63-53860, in order to obtain big braking power by small brake pedal force.

This booster equipment comprises a space formed by a front shell and a rear shell, and the space is divided into two chambers by center plate. Each of these chambers is divided into a constant pressure chamber and a variable pressure chamber by said two power pistons.

In this tandem type brake booster equipment, when the brake pedal is depressed for braking purpose, a control valve is switched over, and the atmospheric air is introduced through a passage into two variable pressure chambers divided by two power pistons. Two power pistons are then operated by the atmospheric pressure of the air thus introduced. By the action of these power pistons, the master cylinder is operated to generate the braking hydraulic pressure and to perform braking operation. In this case, the maximum braking hydraulic pressure thus generated is higher than that of the brake booster equipment operated by a single power piston because the piston of the master cylinder is operated by two power pistons.

In this tandem type brake booster equipment, the power piston is furnished with a diaphragm, and the inner peripheral bead of the diaphragm is fixed on the valve body, which accommodates said control valve. Thus, said passage where the air flows is opened to the variable pressure chamber at a point between the fixed portion of inner peripheral bead of the diaphragm and said center plate.

However, when the passage is opened to the variable pressure chamber between inner peripheral bead and the center plate, the gap between the center plate and the fixed portion of the bead must be maintained at least to some extent. This requires longer overall length of the equipment.

SUMMARY OF THE INVENTION

It is an object of the present invention to shorten the overall length of the negative pressure booster equipment as practical as possible.

To attain the above object, the negative pressure booster equipment according to the present invention is characterized in that the inner peripheral bead of the diaphragm fixed on valve body and forming the power pistons is provided with a groove to communicate the variable pressure chambers defined by the diaphragms with the passages corresponding to the variable pressure chambers.

In the negative pressure booster equipment by this invention with such configuration, the air passage is opened to the variable pressure chamber through the groove formed on the bead of the diaphragm.

Therefore, there is no need to provide a big gap between the fixed portion of the bead and the center plate to open the air passage to the variable pressure chamber. Accordingly, overall length of the negative pressure booster equipment is shortened.

Still other objects and advantages of the invention will in part be obvious and will in part be apparent from the specification.

The invention accordingly comprises the features of construction, combinations of elements, and and arrangement of parts which will be exemplified in the construction hereinafter set forth, and the scope of the invention will be indicated in the claims.

DESCRIPTION OF THE PREFERRED EMBODIMENTS

In the following, the embodiments of this invention will be described in connection with the drawings.

Figure 1:
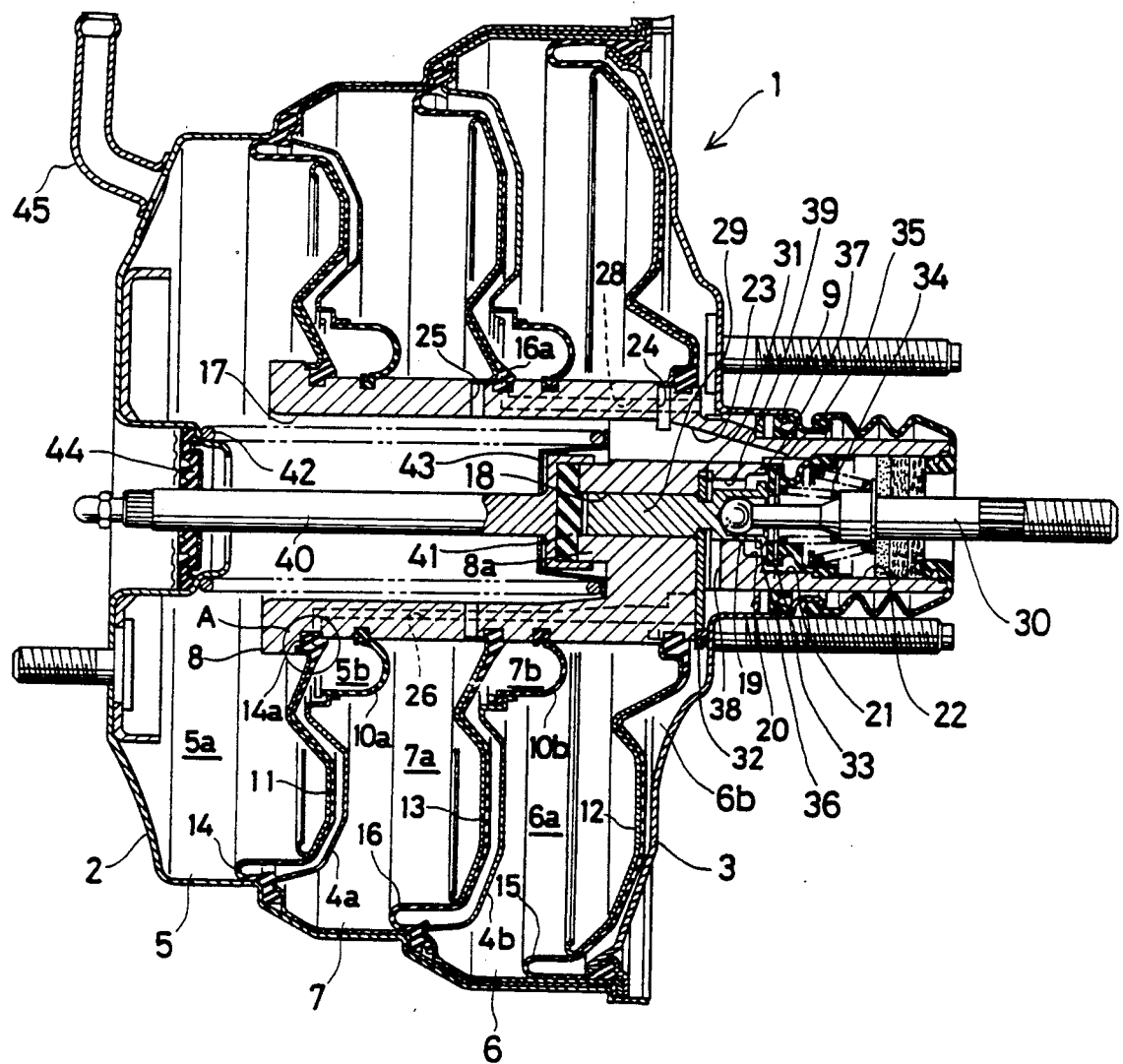
FIG. 1 is a longitudinal sectional view of an embodiment of a triple type negative pressure booster equipment by this invention applied to a brake booster equipment.

As shown in FIG. 1, the brake booster equipment 1 is furnished with a front shell 2 and a rear shell 3, and the front shell 2 and the rear shell 3 are joined together, for example, by bayonet joint to form a large space between them.

The space between the shells 2 and 3 is divided into a front chamber 5 and a rear chamber 6 by two center plates 4a and 4b, and into a center chamber 7 between these two chambers 5 and 6. A valve body 8 is provided to pass through the rear shell 3 and the center plates 4a and 4b, and the valve body 8 is supported airtightly and slidably on the rear shell 3 by a sealing member 9. The inner peripheral ends of a pair of the center plates 4a and 4b are connected with the valve body 8 through the diaphragms 10a and 10b. By these diaphragms 10a and 10b, each of the chambers 5, 6 and 7 are shut off from each other in airtight manner, and the valve body 8 can move in relation to the center plates 4a and 4b.

To the valve body 8, a front power piston member 11, a rear power piston member 12 and a center power piston member 13 are arranged respectively in the front chamber 5, and the rear chamber 6 and the center chamber 7 are connected. On the backside of each of these power piston members 11, 12 and 13, a front diaphragm 14, a rear diaphragm 15 and a center diaphragm 16 are provided respectively between the shells 2 and 3 and the valve body 8. The front power piston member 11 and the front diaphragm 14, the rear power piston member 12 and the rear diaphragm 15, and the center power piston member 13 and the center diaphragm 16 make up the power pistons of this invention respectively. By these power pistons, the front chamber 5 is divided into a first constant pressure chamber 5a and a first variable pressure chamber 5b, the rear chamber 6 is divided into a second constant pressure chamber 6a and a second variable pressure chamber 6b, and the center chamber 7 is divided into a third constant pressure chamber 7a and a third variable pressure chamber 7b.

The valve body 8 is furnished with a recessed portion 17 opening to the first constant pressure chamber 5a, and a projection 8a protruding toward the first constant pressure chamber 5a is provided on the bottom of this recessed portion 17. The valve body 8 is furnished with a first bore 18 opened to the recessed portion 17. Further, a second bore 19, a third bore 20 and a fourth bore 21 and a fifth bore 22 opening to the atmospheric air are furnished from left to right, communicating with the bore 18. The valve body 8 is further furnished with an axial passage, communicating the fourth bore 21 with the first constant pressure chamber 5a, and a radial passage 24, is provided communicating this passage 23 with the second constant pressure chamber 6a. The valve body 8 is further furnished with a radial passage 25, communicating the recessed portion 17 with the third constant pressure chamber 7a. By these passages 24 and 25, both the second and the third constant pressure chambers 6a and 7a are permanently communicated with the first constant pressure chamber 5.

The valve body 8 is furnished with a passage 26 in axial direction from the second variable pressure chamber 6b, and the passage 26 is extended to the fixed portion of the inner peripheral bead 14a of the front diaphragm 14.

Figure 2:
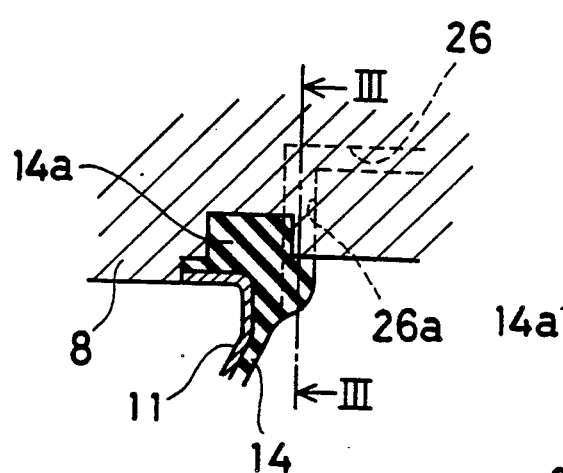
FIG. 2 is an enlarged detail drawing of the portion A of FIG. 1.
Figure 3:
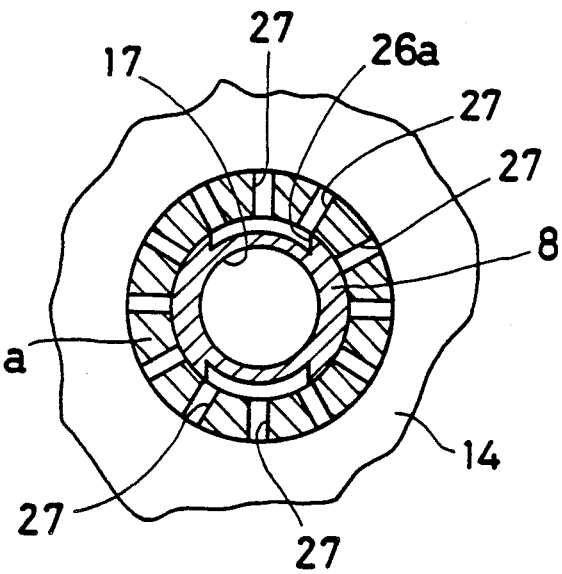
FIG. 3 is a sectional view along the line III—III of FIG. 2.

As it is evident from FIG. 2 and FIG. 3, the passage 26 of valve body 8 is communicated with the groove 26a in radial direction at its tip. On the other hand, the inner peripheral bead 14a of the diaphragm 14 is provided with a large number of radial grooves 27, 27, ... to peripheral direction with equal spacings. The groove 26a and the groove 27 are communicated with each other when the bead 14a is fixed on the valve body 8. Accordingly, the passage 26 communicates the first variable pressure chamber 5b with the second variable pressure chamber 6b. Further, the valve body 8 is furnished with the other axial passage 28 from the second variable pressure chamber 6b. This passage 28 is extended to the fixed portion of the inner peripheral bead 16a of the center diaphragm 16 and is communicating with the third variable pressure chamber 7b through the radial groove as in the case of the passage 26 and through the radial groove furnished on the bead 16a. Accordingly, the second variable pressure chamber 6b is permanently communicated with the first and the third variable pressure chambers 5b and 7b.

On the first bore 18 and the second bore 19 of the valve body 8, a valve plunger 29 is slidably engaged. To the right end of the valve plunger 29, an input shaft 30 coupled with the brake pedal (not shown) is connected. On the valve plunger 29, a key member 32, passing the radial bore 31 formed on the valve body and protruding into the bore 19, is engaged to axial direction so that it can move for a predetermined distance. Accordingly, the key member 32 moves to axial direction together with the valve plunger 29 after it moves with the valve plunger 29 for a predetermined distance. Also, the key member 32 prevents the valve plunger 29 from moving out of the valve body 8.

Further, the key member 32 can move toward axial direction for a predetermined distance between the front end wall and the rear end wall of the bore 31 in relation to the valve body 8.

A control valve 33 is provided between the third bore 20 and the fourth bore 21 of the valve body 8. This control valve 33 is mounted on the valve body 8 and comprises a valve disc 35, which is pressed toward the valve plunger 29 by the resilient force of the spring 34 between this and input shaft 30, a first valve seat 36 formed at the right end of the valve plunger 29 and a second valve seat 37 formed on the valve body 8. When the valve disc 35 is seated on the first valve seat 36 and is separated from the second valve seat 37, this control valve 33 communicates the first, the second and the third constant pressure chambers 5a, 6a and 7a with the first, the second and the third variable pressure chambers 5b, 6b and 7b through the radial passage 38 and the axial passage 39 formed on the second bore 19 and shuts off the communication of the first, the second and the third variable pressure chambers 5b, 6b and 7b. When the valve disc 35 is separated from the first valves seat 36 and is seated on the second valve seat 37, the control valve shuts off the communication of the first, the second and the third constant pressure chambers 5a, 6a and 7a with the first, the second and the third constant pressure chambers 5b, 6b and 7b and provides the communication of the first, the second and the third variable pressure chambers 5b, 6b and 7b with the atmospheric air.

An output shaft 40 is provided in the recessed portion 17 of the valve body 8, and the projection 8a of the valve body 8 is slidably engaged in the bore formed on the portion with larger diameter at the right end of this output shaft 40. Also, a reaction disc 41 is accommodated in the bore of the portion with larger diameter of the right end between the valve body 8 and the output shaft 40. The left end of the valve plunger 29 is placed face-to-face to the reaction disc 30 with a certain gap. The output shaft 40 is prevented from moving out of the valve body 8 by a retainer 43, which is pressed toward right by a returning spring 42 to move back the valve body 8 to the non-operating position. The left end of the output shaft 40 is airtightly and slidably supported by the sealing member 44 and is protruding outwardly from the front shell 2, and the left end is coupled with the piston of the master cylinder (not shown) mounted on the front shell 2.

The valve body 8 and each of the power pistons connected with it are maintained at the non-operating position as shown by the return spring 42. In the non-operating position, the key member 32 maintains the valve plunger 29 at the backward limit position by limiting the rightward movement of the valve plunger 29. When the input shaft 30 is not operating, the key member 32 is at the advanced position relative to the valve body 8. In this case, the valve disc 35 is seated together with the first valve seat 36 and the second valve seat 37, and the first, the second and the third variable pressure chambers 5b, 6b and 7b are shut off from the atmospheric air and from any of the first, the second and the third constant pressure chambers 5a, 6a and 7a. Accordingly, when the valve plunger 29 is operated as the input shaft 30 advances during the braking operation, the valve disc 35 is separated from the first valve seat 36 immediately, and the first, the second and the third variable pressure chambers 5b, 6b and 7b are communicated with the atmospheric air.

The first constant pressure chamber 5a is communicated, for example, with the intake manifold of the engine (not shown) through a negative pressure inlet pipe 45 mounted on the front shell 2. Accordingly, negative pressure is always introduced into the first, the second and the third constant pressure chambers 5a, 6a and 7a.

Next, description will be given on the operation of this embodiment.

When the brake booster equipment 1 is at the non-operating position as shown in the drawing, the pressure in the first, the second and the third variable pressure chambers 5b, 6b and 7b is a little higher than the pressure in the first, the second and the third constant pressure chambers 5a, 6a and 7a, and it is the pressure approximately balanced with the force added with the resilient force of the return spring 42.

When the brake pedal is pressed for the braking operation, the input shaft 30 advances toward the valve body 8. As the input shaft 30 advances, the valve plunger 20 moves forward in relation to the valve body 8. As soon as the valve plunger 29 moves forward, the first valve seat 36 is separated from the valve disc 35 of the control valve 33. As the result, the air with atmospheric pressure enters the second variable pressure chamber 6b through the gap between the valve disc 35 and the first valve seat 36, the passages 39 and 38. The air entering into the second variable pressure chamber 6b flows into the first variable pressure chamber 5b through the passage 26, the groove 26a and the groove 27. Further, the air entering into the second variable pressure chamber 6b flows into the third variable pressure chamber 7b through the passage 28, the groove of the valve body 8 and the groove of the bead 16a. As the result, each of the power pistons is operated. When the valve body 8 moves forward, the brake booster equipment 1 generates output through the output shaft 40 and operates the piston of the master cylinder. Thus, braking operation is started.

The left end of the valve plunger 29 touches the reaction disc 41. The reaction force is transmitted from master cylinder to valve plunger 29 through reaction disc 41, and it is further transmitted to the driver through input shaft 30 and brake pedal.

When the brake pedal is released to cancel the braking, the input shaft 30, valve plunger 29 and key member 32 move backward, i.e. rightward relative to the valve body 8 until the key member 32 touches the rear end wall of the bore 31. With the backward movement of valve plunger 29, the first valve seat 36 touches the valve disc 35, shutting off the first, the second and the third variable pressure chambers 5b, 6b and 7b and the atmospheric air. At the same time, the valve disc 35 is separated from the second valve seat 37, and the first, the second and the third variable pressure chambers 5b, 6b and 7b are communicated with the first, the second and the third constant pressure chambers 5a, 6a and 7a. As the result, the air in the first, the second and the third variable pressure chambers 5b, 6b and 7b flows toward the first constant pressure chamber 5a and is further flows toward the intake manifold through the negative pressure inlet pipe 45. In this case, the valve plunger 29 is at the most backward position relative to the valve body 8, and the gap between the valve disc 35 and the second valve seat 37 is increased to the maximum. Accordingly, the air in the first, the second and the third variable pressure chambers 5b, 6b and 7b flow rapidly. Thus, the valve body 8 and each of the power pistons are moved rapidly by resilient force of the spring 42.

When the key member 32 touches the inner surface of the rear shell 3, the valve plunger 29 and the key member 32 do not move backward any more, but the valve body 8 continues to move backward. When the second valve seat 37 touches the valve disc 35, the air in the first, the second and the third variable pressure chambers 5b, 6b and 7b stops to flow out, and the power pistons do not move backward and stay at the backward limit position. Thus, the valve body 8 and the valve plunger 29 are at the initial non-operating position as shown in the drawing.

Figure 4:
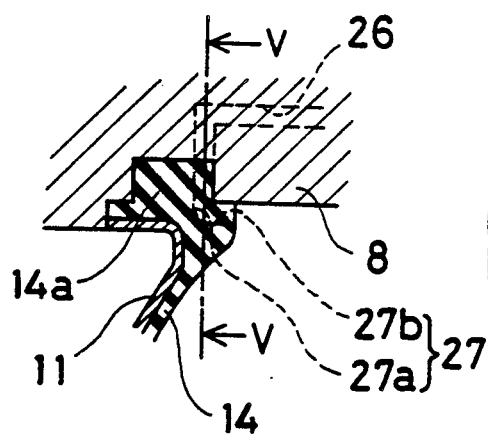
FIG. 4 is an enlarged detail drawing to show another embodiment of this invention.
Figure 5:
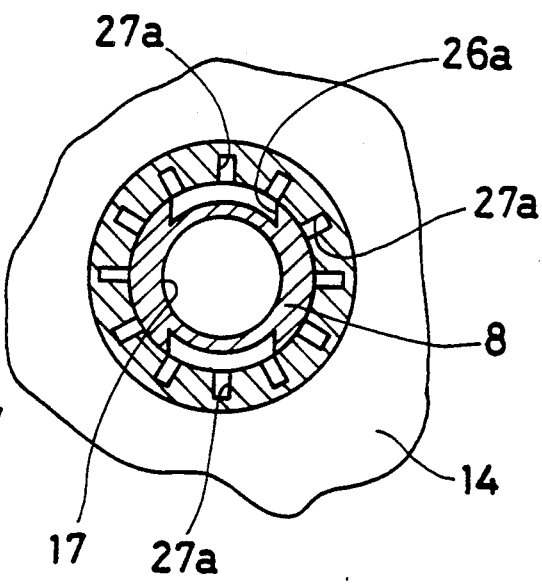
FIG. 5 is a sectional view along the line V—V of FIG. 4.

FIG. 4 and FIG. 5 are the sectional views similar to FIG. 2 and FIG. 3, showing another embodiment of this invention. The same number denotes the same components of the embodiment as described above, and the detailed description is not given here.

As it is evident from FIG. 4 and FIG. 5, this embodiment is the same as the embodiment described above, except that the groove 27 as provided on the inner peripheral bead 14a of the diaphragm 14 consists of a first groove 27a extending to radial direction and a second groove 27b extending to axial direction.

The operation of tis embodiment is exactly the same as that of the embodiment described above, and the description is not given here.

In these two embodiments of the brake booster equipment, the air passages 26 and 28 communicating with the variable pressure chambers 5b and 7b are opened to the variable pressure chambers 5b and 7b through the groove 27 on the beads 14a and 16a of the diaphragms 14 and 16. Thus, it is not necessary to have a wide gap between the center plates 4a and 4b and the beads 14a and 16a. By the decrease of the gap, it is possible to shorten the overall length of the brake booster equipment 1.

In the two embodiments as described above, description was given on the case where the invention was applied to the triple type brake booster equipment, whereas it is needless to say that this invention can be applied to the tandem type booster equipment.

Also, description was given on the case where the negative pressure booster equipment according to this invention was applied to the brake booster equipment, whereas the present invention can also be applied to the other booster equipment such as clutch booster.

As it is self-explanatory from the above description, the negative pressure booster equipment of this invention makes it possible to effectively shorten overall length of the negative pressure booster equipment because the air passage is opened to the variable pressure chamber through the groove on the bead of diaphragm and the space for the opening can be reduced.

What we claim is:

1. A negative pressure booster equipment, comprising a predetermined number of center plates, which divide the space formed by a front shell and a rear shell into two or more chambers, a valve body passing through said center plates and said rear shell airtightly and movably, power pistons coupled with the valve body and arranged in said two or more chambers and dividing these chambers into constant pressure chambers where negative pressure is introduced and variable pressure chambers where the air of atmospheric pressure is introduced during operation and said power pistons being provided as many as said chambers, a valve plunger mounted slidably on said valve body, an input shaft coupled with the valve plunger and disposed within said valve body movably back and forth, and a control vale, disposed in said valve body and operated by said valve plunger to selectively switch over the communication of each of said variable pressure chambers with the atmospheric air or with each of said constant pressure chambers through the passages formed by said valve body, characterized in that each of said power pistons is provided with a diaphragm having the inner peripheral beads fixed on said valve body, and that a groove is provided on the inner peripheral bead of at least one of said diaphragms in order to communicate said variable pressure chambers divided by said diaphragm with said passages corresponding to said variable pressure chambers.

2. A negative pressure booster according to claim 1, wherein said inner peripheral bead of said diaphragm is provided with two or more radial grooves, and at least one of the grooves communicates with said passage corresponding to said variable pressure chamber.

3. A negative pressure booster according to claim 2, wherein said groove as formed on said inner peripheral bead of said diaphragm consists of a first groove extending to radial direction and a second groove extending to axial direction, and said first and second grooves are communicated with each other.

* * * * *